Dec. 24, 1957  T. HINDMARCH  2,817,249
POWER TRANSMISSION COUPLINGS
Filed Dec. 15, 1952  2 Sheets-Sheet 1
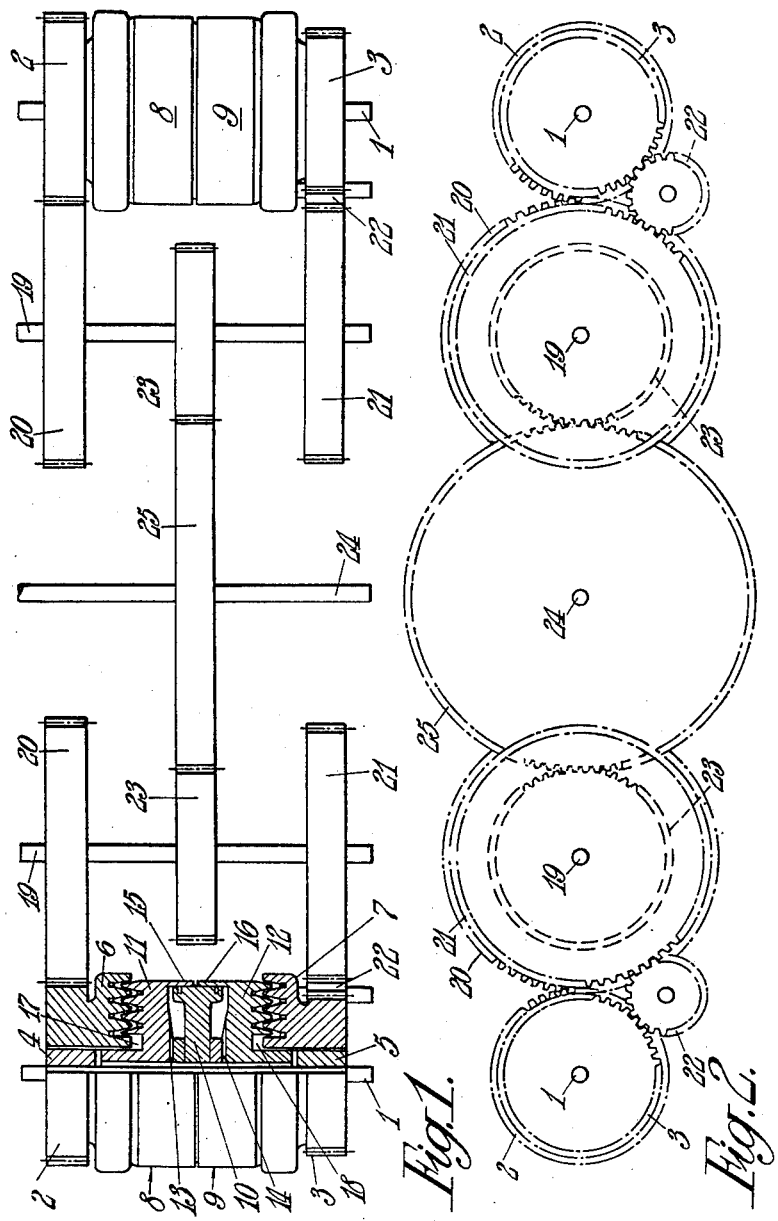
Inventor
T. Hindmarch Dec. 24, 1957  T. HINDMARCH  2,817,249
POWER TRANSMISSION COUPLINGS
Filed Dec. 15, 1952  2 Sheets-Sheet 2

Inventor
T. Hindmarch
Attys.

United States Patent Office 2,817,249
Patented Dec. 24, 1957

2,817,249

POWER TRANSMISSION COUPLINGS

Thomas Hindmarch, Chesham, England

Application December 15, 1952, Serial No. 325,946

Claims priority, application Great Britain
December 20, 1951

4 Claims. (Cl. 74—665)

This invention relates to power transmission gear and has for its object to provide a change speed and/or reverse power transmission gear for use in ships, locomotives and other vehicles, which will occupy little space, particularly in a direction axial of the prime movers to which it is fitted.

The invention consists in a clutch and pinion assembly comprising a shaft, a disc-like abutment member rigidly fixed coaxially on said shaft, a pinion mounted on said shaft on each side of and spaced from said abutment member for free rotation thereon without longitudinal movement, the side of each pinion facing the abutment member being provided with V-shaped annular grooves to form one friction member of a clutch, a disc-like member between the abutment member and each pinion mounted upon splines upon and coaxially of the shaft for movement longitudinally only of the latter, the faces of the latter disc-like members opposite to the grooved sides of the pinions being provided with complementary V-shaped annular grooves, the abutment member together with the longitudinally movable disc-like members forming therebetween a pair of expansible and contractible pressure chambers for causing the engagement and disengagement of the latter disc-like members with the corresponding pinions by fluid pressure therein.

By the use of an intermediate shaft in each unit in such an arrangement a much freer choice of the positions of the input shaft is obtained than is possible when the intermediate shafts are not used.

The accompanying drawings show, by way of example only, two embodiments of the invention in which:

Figure 1 is a plan view of a transmission mechanism having two change direction gear units;

Figure 2 is a cross section of the arrangement of the gears of Figure 1, and

Figure 3:
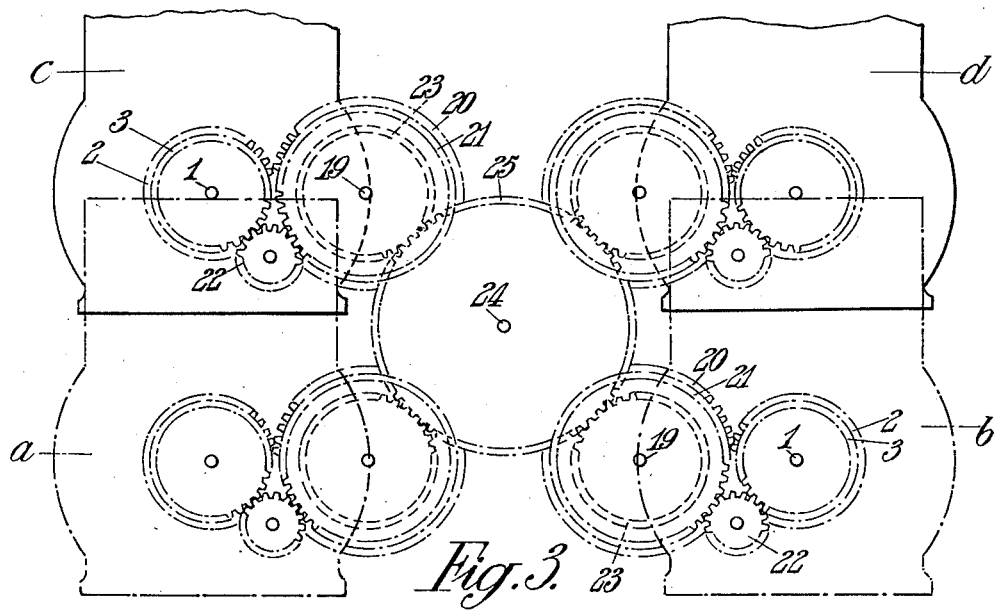
Figure 3 is a cross section of the arrangement of the gears in a transmission mechanism having four prime movers and therefore four change direction gear units.

Each of the two units in Figure 1 comprises an input shaft 1 having the forward and reverse pinions 2 and 3 free to rotate thereon about the bearings 4 and 5. These pinions are formed integral with the clutch members 6 and 7 of the pressure fluid operated clutches 8 and 9. Intermediate the clutch members 6 and 7 there is provided the abutment member 10 in the form of a disc concentric with and fixed on the input shaft.

The pinions on each input shaft are positioned at opposite ends thereof to afford room therebetween for the abutment member.

On both sides of this abutment 10 are provided movable clutch members 11 and 12 splined on the shaft 1 for rotation therewith and free to move longitudinally of the shaft to contact the clutch members attached to or formed as part of the pinions. The fixed and movable clutch members are provided with concentric V-shaped interengageable grooves, the grooves of each pair of clutch members being the complement of the grooves on the other clutch member. Pressure fluid cavities 13 and 14 are provided between the abutment member and the movable clutch members into which pressure fluid may be introduced by way of fluid channels formed in the input shaft to move the movable clutch members alternatively into engagement with the fixed members. The outer periphery of the abutment member forms a sliding fit inside cylindrical sealing members 15 and 16 formed on each of the movable clutch members and which form the outer peripheral walls of the cavities. The clutch members fixed in relation to the pinions may be positioned either to the inner sides of the latter or within the pinions as desired and depending on the diameter of the latter.

The clutches are caused to be disengaged by a continuous fluid pressure supplied by way of a fluid channel in the input shaft to smaller pressure fluid cavities 17 and 18 formed on the opposite side of the movable clutch members to the main cavities. As the surface area to which this continuous fluid pressure is applied is considerably less than that of the main cavities the continuous pressure is overcome when the fluid is introduced to the main cavities to engage the clutches.

The intermediate shaft in each unit is supported parallel to the input shaft and has fixed thereto or formed integral therewith pinions 20 and 21 in alignment with the pinions on the input shaft, one of which is driven directly by a corresponding pinion while the other is driven indirectly by way of an idler wheel 22 to give a reverse direction of drive in relation to the former.

A third pinion 23 also fixed to the intermediate shaft or formed integral therewith, is provided between the two pinions on this shaft for transmitting the drive from the said shaft to a common toothed wheel 25 on an output shaft of the power transmission mechanism and parallel to the intermediate shaft in each unit.

When only two prime movers and consequently only two units are provided it is convenient to dispose them on diametrically opposite sides of the axis of the output shaft 24 as shown in Figures 1 and 2, the prime movers being both on the same side of the output toothed wheel 25. When, for example, four prime movers are provided and there are four gear units, the output pinion 23 on the intermediate shaft can be in any convenient position around the output toothed wheel and the prime movers can be positioned either all on the same side of the latter wheel or two on one side and two on the other. It can therefore be seen that the number of units spaced around the output toothed wheel is only limited by the number of prime movers used and the size of the output toothed wheel, and that the prime movers can be positioned on either side of the said wheel as is most convenient.

The prime movers a and b in Figure 3 are situated on the near side of the output toothed wheel 25 while the prime movers c and d are on the further side thus allowing adequate space both fore and aft and abeam a ship in which the transmission is situated. The arrangement of the gears in the units is similar to that described in reference to Figures 1 and 2 and the output pinions 23 on the respective intermediate shafts all drive the common output toothed wheel 25 on the output shaft 24. All the references of Figure 3 relate to the corresponding parts on Figures 1 and 2.

The units need not be identical and each can vary in size depending on the power and speed of the prime mover to which it is attached, thus making it possible to successfully run together different sizes of prime movers.

It can be understood from the foregoing description that a coupling may be provided in accordance with the invention which is compact and adaptable to a variety of arrangements of the relative positions of the prime movers with which it is used. Whilst these representative combinations as described do not cover all the means by which this reversing clutch gear unit can be employed, it permits a variety of symmetrical or unsymmetrical layouts whereby the engines may be arranged at different levels or with different numbers of engines on one side of the shaft from the other, and with different centres in an athwartship and above and below direction. The major advantages lie in the following:

(1) Several engines can be coupled to one shaft.
(2) One or more of these engines can be coupled while the others are in motion.
(3) Transmission gears are very compact.
(4) No external clutches are required.
(5) The engines may be very compactly arranged.
(6) The reverse slipping clutches are in slipping engagement before the shaft comes to rest.
(7) It is unnecessary to bring the propeller shaft to rest before operating the controls.
(8) The gear units may be all interchangeable.
(9) The clutch members may be all of the same size.
(10) The engines can be directly coupled.
(11) Non-reversing engines can be employed.
(12) The lay-out as a whole is very compact, efficient, and relatively inexpensive.
(13) This lay-out permits a lay-out inside the ship which is very economical of cargo space.
(14) Inexpensive high speed engines of relatively smaller cubic capacity can be made to cooperate to drive a slow speed propeller and only one propeller need be used with a multiplicity of engines.

The gear units may be provided with separate gear casings attached to a casing for the output toothed wheel or the whole transmission may be situated in one casing and other details for carrying the invention into effect may be varied without departing from the scope of the invention.

What is claimed is:

1. Clutch and pinion assembly comprising a shaft, a disc-like abutment member rigidly fixed coaxially on said shaft, a pinion mounted on said shaft on each side of and spaced from said abutment member for free rotation thereon without longitudinal movement, the side of each pinion facing the abutment member being provided with V-shaped annular grooves to form one friction member of a clutch, a disc-like member between the abutment member and each pinion mounted upon splines upon and coaxially of the shaft for movement longitudinally only of the latter, the faces of the latter disc-like members opposite to the grooved sides of the pinions being provided with complementary V-shaped annular grooves, the abutment member together with the longitudinally movable disc-like members forming therebetween a pair of expansible and contractible pressure chambers for causing the engagement and disengagement of the latter disc-like members with the corresponding pinions by fluid pressure therein, and a coaxial cylindrical projection on each disc-like member which cooperates with the abutment to seal the pressure chambers.

2. Change direction gear incorporating a clutch and pinion assembly comprising a shaft, a disc-like abutment member rigidly fixed coaxially on said shaft, a pinion mounted on said shaft on each side of and spaced from said abutment member for free rotation without longitudinal movement thereon, the side of each pinion facing the abutment member being provided with V-shaped annular grooves to form one friction member of a clutch, a cup-like member between the abutment member and each pinion mounted upon splines upon and coaxially of the shaft for movement longitudinally only of the latter, the external end face of each of the cup-like members being provided with V-shaped annular grooves which are complementary of the grooves on the pinions, the sides of the cup-like members co-operating with the periphery of the abutment member to form therebetween a pair of expansible enclosed pressure chambers for causing the engagement of the grooved face of each cup-like member with the corresponding pinion by fluid pressure therein.

3. Change direction gear of the kind having a plurality of input shafts and a common output shaft incorporating a plurality of reversing gear units each having a clutch and pinion assembly comprising a shaft, a disc-like abutment member rigidly fixed coaxially on said shaft, a pinion mounted on said shaft on each side of and spaced from said abutment member for free rotation without longitudinal movement thereon, the side of each pinion facing the abutment member being provided with V-shaped annular grooves to form one friction member of a clutch, a cup-like member between the abutment member and each pinion mounted upon splines upon and coaxially of the shaft for movement longitudinally only of the latter, the external end face of each of the cup-like members being provided with V-shaped annular grooves which are complementary of the grooves on the pinions, the sides of the cup-like members co-operating with the periphery of the abutment member to form therebetween a pair of expansible enclosed pressure chambers for causing the engagement of the grooved face of each cup-like member with the corresponding pinion by fluid pressure therein.

4. Change direction gear incorporating a clutch and pinion assembly comprising a shaft, a disc-like abutment member rigidly fixed coaxially on said shaft, a pinion mounted on said shaft on each side of and spaced from said abutment member for free rotation without longitudinal movement thereon, the side of each pinion facing the abutment member being provided with surfaces forming one friction member of a clutch, a cup-like member between the abutment member and each pinion mounted coaxially of the shaft for movement longitudinally only of the latter, the external end face of each of the cup-like members being provided with surfaces which are complementary of the surfaces on the pinions, the sides of the cup-like members cooperating with the periphery of the abutment member to form therebetween a pair of expansible enclosed pressure chambers for causing the engagement of the surface of each cup-like member with the corresponding pinion by fluid pressure therein.

References Cited in the file of this patent

UNITED STATES PATENTS

| 847,572 | Hanson | Mar. 19, 1907 |
| 857,393 | Hagman | June 18, 1907 |
| 2,518,781 | Hindmarch | Aug. 15, 1950 |
| 2,632,544 | Hockert | Mar. 24, 1954 |

FOREIGN PATENTS

| 943,690 | France | Oct. 11, 1948 |